United States Patent [19]
Uno

[11] 3,825,352
[45] July 23, 1974

[54] AUTOMATICALLY ACTUATED LIGHT MEASURING SYSTEM

[75] Inventor: Naoyuki Uno, Iruma-gun, Saitama-ken, Japan

[73] Assignee: Asahi Kogaku Kogyo Kabushiki Kaisha, Tokyo-to, Japan

[22] Filed: May 27, 1969

[21] Appl. No.: 828,274

[30] Foreign Application Priority Data
June 5, 1968  Japan.............................. 43-37980

[52] U.S. Cl................................. 356/226, 250/210
[51] Int. Cl. ............................................. G01j 1/44
[58] Field of Search .......... 356/218, 222, 225, 226; 250/210; 315/154

[56] References Cited
UNITED STATES PATENTS

| | | | |
|---|---|---|---|
| 1,229,740 | 6/1917 | Furstenau...................... | 250/210 X |
| 1,287,970 | 12/1918 | Greinacher et al............ | 250/210 X |
| 2,028,153 | 1/1936 | Gunn................................ | 250/210 |
| 2,149,250 | 3/1939 | Bing................................ | 356/226 X |
| 2,375,677 | 5/1945 | Moore ........................... | 315/154 X |

Primary Examiner—Ronald L. Wibert
Attorney, Agent, or Firm—Wolder & Gross

[57] ABSTRACT

An automatically energized light measuring system comprises a null type electrical measuring network such as a differential meter including a light measuring first photoconductor connected in series with one coil and a variable resistor connected in series with the other coil, or a bridge including a variable resistor in one leg and the first photoconductor in another leg. The electrical measuring network is connected through a second photoconductor to an energizing battery.

7 Claims, 2 Drawing Figures

PATENTED JUL 23 1974

3,825,352

INVENTOR
NAOYUKI UNO
BY *Stanley Wolder*
ATTORNEY

AUTOMATICALLY ACTUATED LIGHT MEASURING SYSTEM

BACKGROUND OF THE INVENTION

The present invention relates generally to improvements in light measuring devices and it relates particularly to an improved battery energized light measuring system.

In the measurement of the intensity of incident light attendant to the adjustment of the exposure parameters of a camera such as diaphragm opening and shutter exposure time it is common to employ as the photosensitive element a photoconductor which is associated with an energizing battery voltage source. For many reasons, a light measuring network which consists of a photoconductor connected in series with a current meter across a battery is unsatisfactory when employed in association with an exposure control system. Accordingly, a zero registration or null type measuring network is employed in light meter coupled, exposure parameter determining systems in which the desired condition is indicated by a null or current meter reading corresponding to that of the circuit being in an unenergized or dormant condition. These null type light measuring networks may be of the bridge type in which a photoconductor is in one of the legs or may employ a differential bucking coil meter in which the photoconductor is connected in series with one of the coils.

In a zero-registration or null type system exposure meter, when the camera is not utilized and is put in a dark place such as inside the camera case, the light responsive photoconductor has a high resistance value and a current scarcely flows through the photocurrent circuit under the control of the photoconductor, while a current of considerable intensity flows through the other side of the bridge circuit or the other coil of the differential type indicating meter. Thus, such exposure meter would not be practical with such structure alone, due to excessive consumption of the voltage source battery. Accordingly, the exposure meter of the aforesaid type is provided with a current source switch which should be closed only when the exposure meter is employed so as to prevent wasteful consumption of the current source battery.

Now, since in a zero-registration or null type system exposure meter the proper exposure indication is provided by a meter pointer at a neutral position consequent to the bridge circuit balanced condition or the input current balance condition of the differential type meter is established, such proper exposure indicating zero point position is occupied also by the meter pointer when the current supply to the network is stopped due to non-use of the camera. Thus, with such exposure meter network having a current source switch, it is highly likely that the user may forget to close the current source switch and could mistake the non-current condition for the proper exposure condition, causing improper exposure and failure of photographing.

SUMMARY OF THE INVENTION

It is a principal object of the present invention to provide an improved light measuring system.

Another object of the present invention is to provide an improved camera coupled light measuring system.

Still another object of the present invention is to provide an improved null type light measuring system.

A further object of the present invention is to provide an improved null type light measuring system which is automatically energized by exposure to light and substantially deenergized in the absence of light whereby to minimize the consumption of current and obviate mistakenly interpreting the deenergized network reading as an indication of balance.

Still a further object of the present invention is to provide a light measuring network of the above nature characterized by its reliability, accuracy, efficiency, simplicity and versatility.

The above and other objects of the present invention will become apparent from a reading of the following description taken in conjunction with the accompanying drawing which illustrates preferred embodiments thereof.

In a sense the present invention contemplates the provision of a light measuring system comprising a null type electrical measuring network including a first photoconductor as a current varying element thereof, a voltage source for energizing said measuring network, and means including a second photoconductor for connecting said voltage source to said measuring network.

According to a preferred form of the improved system the measuring network comprises a differential current meter including a pair of coils, one coil being connected in series with a resistor, a multielement light measuring first photoconductor, and a power control second photoconductor, across the voltage source battery, and the second coil being connected in series with parallel connected variable resistors, and the second photoconductor across the battery. In accordance with another embodiment of the present invention there is provided a bridge network including a potentiometer, and a photoconductor and resistor connected in series between the potentiometer resistance element terminals. A meter is connected between the potentiometer movable contact and the resistor-photoconductor junction. The battery is connected in series with the second photoconductor across the potentiometer resistance element.

The photoconductors are concurrently exposed to the light only during the light measuring operation. Thus, in the absence of light, for example, during storage of the camera, the second photoconductor is unexposed and of such high resistance that the battery drain is insignificant. On the other hand, during light measurement, the resistance of the second photoconductor drops sufficiently to energize the measuring network and since this is of the null type and the proper measurement accordingly independent of the source voltage, variations in the resistance of the photoconductor does not effect the accuracy of the reading. There has thus been provided a null type light measuring network having an automatic actuating and deactuating means to minimize battery drain and assure energization during measurement and which obviates the need of any manually operated switch.

DESCRIPTION OF THE PREFERRED EMBODIMENTS

Figure 1:
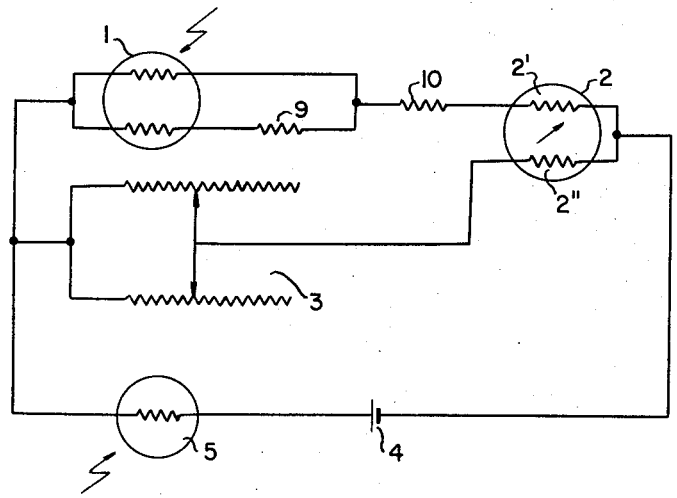
FIG. 1 is a circuit diagram of a preferred embodiment of the present invention.

Referring now to the drawing, and particularly FIG. 1 thereof which illustrates a preferred embodiment of the present invention, the reference numeral 1 generally designates a dual element light measuring first photoconductor. One pair of terminals of the photoconductor elements of photoconductor 1 are connected through a switch functioning second photoconductor 5 to a first terminal of a voltage source, network energizing battery 4. The other terminals of the elements of photoconductor 1 are connected by a resistor 9 and the junction of resistor 9 and one of the photocondcutor elements is connected through one of the coils 2' of a dual coil differential meter 2 to the second terminal of battery 4.

The other coil 2" of differential meter 2 has one terminal connected to second terminal of battery 4 and the opposite terminal of coil2" is connected through a pair of parallel connected independently adjustable variable resistors 3, in series with the switching second photoconductor 5 to the first terminal of battery 4. The variable resistors 3 may be coupled to camera exposure adjusting elements such as the diaphragm opening adjusting member, shutter speed adjusting member, etc., to be concurrently adjustable therewith. The photoconductor 5 is positioned to receive external light when light measurement is being conducted. For example, when the improved light measuring network is associated with a camera, the light receiving surface of the photoconductor 5 is placed adjacent to a film winding indicating window from which a non-completion indicating plate withdraws when the film winding operation on the camera side is completed or adjacent to a light receiving window which is operated to open or close within the operation range of play angular movement for taking out or putting in the case of the camera before operating the film winding lever.

In operation, when a light measurement is to be made, photoconductor 1 is exposed to the light being measured and photoconductor 5 is also exposed to light. The variable resistors 3 are then adjusted to balance the network, as indicated by a null reading on meter 2, as a consequence of the resistance of the network including photoconductor 1 and resistors 9 and 10 being equal to the resistance of the network of variable resistors 3 so that the currents in meter coils 2' and 2" are equal. The null reading is dependent only on the balancing of the network and not on the value of the energizing voltage so that the value of the resistance of photoconductor 5 does not effect the accuracy of operation as long as it is not so high as to provide insufficient current relative to the sensitivity of meter 2. In the absence of any light measurement, photoconductor 5 is unexposed to light and under such condition is of such a high resistance as to render the current drain of battery 4 entirely insignificant since such current drain is limited by the resistance of photoconductor 5.

Figure 2:
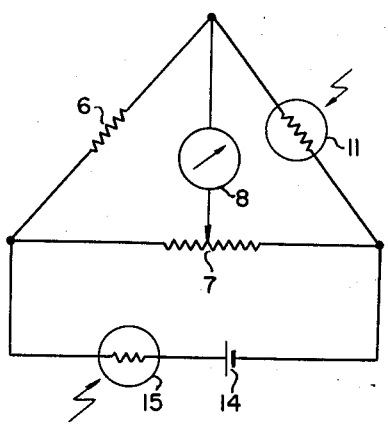
FIG. 2 is a circuit diagram of another embodiment thereof.

In FIG. 2 of the drawing there is illustrated another light measuring system embodying the present invention in which a single coil null type meter 8 instead of a differential meter is employed in a bridge network. Specifically a light measuring first photoconductor 11 is connected in series with a resistor 6 between the terminals of the resistance element of a potentiometer 7. The meter 8 is connected between the movable contact element of potentiometer 7 and the junction of resistor 6 and photoconductor 11. A voltage source energizing battery 14 is connected in series with a switch functioning second photoconductor 15 between the terminals of the resistance element of potentiometer 7.

The positioning and association of photoconductors 11 and 15 are similar to that of photoconductors 1 and 5. The operation of the light measuring system last described is similar to that first described.

When the exposure meter of the present invention is employed the external light receiving switching photoconductor has a very small resistance so that the output of the current source battery 4 is only slightly lowered and is applied to the light measurement system. This lowering of the current source output acts in the same manner upon the photocurrent control circuit and the set value condition circuit of the example as shown in FIG. 1, and also, upon the sides of the bridge circuit of the example as shown in FIG. 2. Therefore, in these two examples of zero-registration system light measurement arrangements, such lowering of the current source output exerts no influence upon the proper exposure indicating operation. Thus, a proper light measurement operation can be carried out without manually operating a current source switch.

When the camera is not employed, through the operation of putting the camera into a case or other operation, the incidence of external light rays on the switching photoconductor 5 or 15 is stopped and the resistance of the photoconductor is greatly increased so that the output current of the current source circuit is greatly restricted. Considering that the life in usual employment of the current source battery in exposure meters of this kind is about two years taking the factor of safety into account, the effect of the minute non-employment output current in the exposure meter of the present invention is practically non-existant.

Thus, in the exposure meter of the present invention, a light measurement system, wherein the pointer occupies the same position when the camera is not employed and when proper exposure is indicated, is provided with a photoconductor which is other than that for light measurement and is inserted in series with the current source battery. With such arrangement it is possible to prevent consumption of the current source battery power when the camera is not employed and also to eliminate manual operation of the current source switch without any effect on proper exposure indication when the camera is employed. In addition to such convenience in operation the arrangement advantageously prevents such erroneous photographing operation that, as is the case with exposure meters of similar kind, when the current supply is stopped, the user mistakes the pointer position as an indication of proper exposure condition.

Further, in the exposure meter of the present invention, the photoconductor serving as a switch requires only such property that its resistance value is lowered when it receives external light and is increased when it is placed in darkness. Thus, the photoconductor is not required to have strict characteristics, such as the light-resistance characteristic, the spectral characteristic, the response characteristic, the temperature characteristic, etc. Accordingly, a very inexpensive element can be employed for this purpose.

Thus, the exposure meter of the present invention can be produced with lower cost and causes less trouble than conventional ones having current source switches, thereby providing further great advantages.

While there have been described and illustrated preferred embodiments of the present invention it is apparent that numerous alterations, omissions and additions may be made without departing from the spirit thereof.

What is claimed is:

1. A light measuring system comprising a bridge network including a first photoconductor and a variable bridge balancing resistor and a null meter connected to indicate the balanced condition of said bridge network, a second photoconductor, and a voltage source connected in series with said second photoconductor to said bridge network whereby to energize said bridge network when said second photoconductor is exposed to light.

2. The light measuring system of claim 1 wherein said measuring network comprises a differential meter defining said null meter and including bucking first and second coils, said first coil, first and second photoconductors and said voltage source being series connected and said second coil, variable resistor, second photoconductor and voltage source being series connected.

3. The light measuring network of claim 2 including a second variable resistor connected in parallel with said first variable resistor.

4. The light measuring system of claim 1 wherein said electrical measuring network comprises a bridge network including said first photoconductor in a leg thereof and said variable resistor in another leg thereof, said meter connected between a pair of opposite corners of said bridge network and said voltage source being connected in series with said second photoconductor between the other pair of opposite bridge network corners.

5. The light measuring network of claim 1 wherein said bridge network comprises a potentiometer defining said variable resistor and a resistance element and a variable contact element, a resistor, and said first photoconductor connected in series with said resistor between the terminals of said resistance element, and said meter is connected between said contact element and the junction of said first photoconductor and said resistor, said voltage source and second photoconductor being series connected between the terminals of said resistance element.

6. The light measuring system of claim 1 wherein said first photoconductor includes a pair of photoconductor elements and comprising a resistor connected between corresponding terminals of said photoconductor elements.

7. An electric exposure meter comprising a measuring network including a first photoconductor, a variable resistor, means for indicating by the null method the relationships between an electrical parameter of said variable resistor and said photoconductor, a second photoconductor, and a voltage source connected in series with said second photoconductor to said measuring network whereby to energize said network when said second photoconductor is exposed to light.

* * * * *